(12) United States Patent
Butler et al.

(10) Patent No.: US 7,332,114 B2
(45) Date of Patent: Feb. 19, 2008

(54) PROCESS FOR MANUFACTURING SOUND ABSORBING CEMENT TILE

(75) Inventors: Steven Roy Butler, Le Thor (FR); Jorg Bold, Le Thor (FR); Eric Millamon, Mondeville (FR); Michel Rigaudon, Caromb (FR)

(73) Assignee: Lafarge Platres, Avignon (FR)

( * ) Notice: Subject to any disclaimer, the term of this patent is extended or adjusted under 35 U.S.C. 154(b) by 367 days.

(21) Appl. No.: 10/906,142

(22) Filed: Feb. 4, 2005

(65) Prior Publication Data

US 2006/0175723 A1 Aug. 10, 2006

(51) Int. Cl.
*B32B 13/14* (2006.01)

(52) U.S. Cl. .................. 264/42; 264/50; 264/145; 264/157; 264/257

(58) Field of Classification Search .................. 264/42, 264/50, 145, 157, 257
See application file for complete search history.

(56) References Cited

U.S. PATENT DOCUMENTS

| | | | |
|---|---|---|---|
| 1,660,402 A | 2/1928 | Thomson | |
| 1,687,067 A | 10/1928 | Hinton | |
| 2,097,088 A | 10/1937 | Mills | |
| 4,676,835 A | 6/1987 | Green et al. | |
| 5,013,157 A | 5/1991 | Mills et al. | |
| 5,085,929 A | 2/1992 | Bruce et al. | |
| 5,116,671 A | 5/1992 | Bruce et al. | |
| 5,158,612 A | 10/1992 | Salovy et al. | |
| 5,227,100 A | 7/1993 | Koslowski et al. | |
| 5,240,639 A | 8/1993 | Diez et al. | |
| 5,250,578 A | 10/1993 | Cornwell | |
| 5,575,844 A | 11/1996 | Bradshaw | |
| 5,643,510 A | 7/1997 | Sucech | |
| 5,660,465 A | 8/1997 | Mason | |
| 5,683,635 A | 11/1997 | Sucech et al. | |
| 5,714,032 A | 2/1998 | Ainsley et al. | |
| 6,376,558 B1 | 4/2002 | Bahner et al. | |
| 6,443,258 B1 | 9/2002 | Putt et al. | |
| 7,033,431 B2 | 4/2006 | Martin et al. | |
| 2005/0021938 A1 | 1/2005 | Kidokoro | |

(Continued)

FOREIGN PATENT DOCUMENTS

DE 2117000 10/1971

(Continued)

OTHER PUBLICATIONS

International Search Report dated Sep. 5, 2006 for WO 2006/082114 (PCT/EP2006/001454).

(Continued)

*Primary Examiner*—Allan R. Kuhns
(74) *Attorney, Agent, or Firm*—Buchanan Ingersoll & Rooney PC

(57) ABSTRACT

A continuous process for manufacturing a sound absorbing tile made from a slurry including, quick setting cement, water, fibers and foaming agent, the process including the steps of (i) mixing cementitious material, water, foaming agent but without incorporation of prefabricated foam with fibers into a slurry; subsequently; (ii) injecting and distributing air into the slurry of step (i) to form a cellular slurry; subsequently; (iii) forming tiles or precursor products of tiles from the cellular slurry; and finally; (iv) allowing the cellular slurry to set into the desired tile or a precursor thereof.

21 Claims, 1 Drawing Sheet

U.S. PATENT DOCUMENTS

2005/0219938 A1    10/2005    Rigaudon et al.

FOREIGN PATENT DOCUMENTS

| | | |
|---|---|---|
| DE | 31 38 808 A1 | 4/1983 |
| EP | 0 490 160 A1 | 6/1992 |
| EP | 0 517 207 A1 | 12/1992 |
| EP | 0 613 764 B1 | 9/1994 |
| EP | 1 568 671 A | 8/2005 |
| FR | 2 089 457 A | 1/1972 |
| WO | 95/16515 A1 | 6/1995 |
| WO | 97/23337 A1 | 7/1997 |
| WO | 02/12141 A1 | 2/2002 |
| WO | 02/20423 A2 | 3/2002 |
| WO | 02/24595 A1 | 3/2002 |
| WO | 02/070427 A1 | 9/2002 |

OTHER PUBLICATIONS

International Search Report dated Jul. 27, 2005 for WO 2005/080294 (PCT/EP2005/002576).

Written Opinion of the International Searching Authority WO 2005/080294 (PCT/EP2005/002576), Jul. 2005.

International Preliminary Report on Patentability dated May 10, 2006 WO 2005/080294 (PCT/EP2005/002576).

PROCESS FOR MANUFACTURING SOUND ABSORBING CEMENT TILE

FIELD OF THE INVENTION

The instant invention relates to a process for manufacturing acoustical cellular cementitious slurry.

DESCRIPTION OF RELATED ART

Cementitious materials are known for many years. Examples of cementitious material can be gypsum (which is available in many forms), Portland cement, sorrel cement, slag cement, fly ash cement, calcium alumina cement, and the like.

U.S. Pat. No. 6,443,258 to Putt discloses a process for making sound absorbing panels in which plaster, fibers, water and foaming agent are mixed and simultaneously aerated using a mixing device similar to a kitchen aide mixer, orbiting and rotating mixing device. Air is entrapped, from the ambient, in the slurry, where the entrapment results from the combination of a dry mixture of plaster, (and optional additives) and of an aqueous mixture of water and surfactant.

A typical industrial use is the manufacture of plaster wallboard. In this process air is usually introduced into the plaster slurry through prefabricated foam. In the usual foam generation systems, a quantity of foam-generating surfactant is diluted with water and then combined with compressed air. A foam is generated using various devices and processes. This foam is injected into the mixer, usually directly in the mixer. The mixer, which is usually a high shear mixer, assures the foam is completely combined with the plaster slurry but at the cost of a huge reduction in foam efficiency. The volume of foam added to the slurry is typically 3 times the volume actually combined in the board. Therefore, in accordance with the classical prior art, part of the gauging water for the plaster is added with the foam. More water in the foam raises the density of the foam and allows more uniform mixing with the plaster slurry, which is of higher density than the foam. However, this additional water reduces the final strength of the gypsum matrix by unnecessarily increasing the space between the gypsum crystals and, thus, forming a weaker structure.

Many types of mixing devices are known in the art; most of them have been disclosed in relation to general plaster technology, few have been dedicated to normal plasterboard, while very few have been designed for acoustical panel.

U.S. Pat. No. 5,575,844 to Bradshaw discloses a secondary mixer (mounted in the same casing), in which the foam is introduced, while water and plaster are introduced in the primary mixer. The first mixer is for plaster and water while the second is for foam addition, where the shear is lower.

U.S. Pat. No. 5,714,032 to Ainsley discloses a two-chamber mixer, comprising a first, high-shear, chamber and a second, low-shear, chamber in which the foam is introduced.

U.S. Pat. No. 5,683,635 to Sucech discloses a process in which the foam is inserted into the slurry at a point closer to the discharge where it is less agitated than during the creation of the slurry in the first mixer, whereby the foam is less agitated than if inserted in the pin mixer itself.

Further, these documents disclose processes that still provide the usual pore volume with no control over the size and distribution of the bubbles.

In everyday kitchen operation air is entrapped from the ambient with a wire whisk. This same method is used for the aeration mention in U.S. Pat. No. 6,443,258 to Putt. This document discloses a process of making sound absorbent panels in which plaster, water and foaming agent are mixed and simultaneously aerated using a mixing device similar to a kitchen aid s mixer, orbiting and rotating mixing device. Air is entrapped, from the ambient, in the slurry, where the entrapment results from the combination of a dry mixture of plaster, (and optional additives) and of an aqueous mixture of water and surfactant However, the process used in this document is of the batch type, which rather unsuitable for an industrial use.

Direct air injection during the creation of the cementitious slurry is also known.

DE-A-2,117,000 to Anton discloses a mixer for producing wall-finishing mortar. The apparatus can be worked according to two embodiments. In the first one, air is forced in a flow of gauging water, where said water has been through a cartridge filled with a surfactant. What is introduced in the mortar mixer is actually foam (pressurized foam). In the second embodiment, no surfactant is mentioned. Air is introduced in the slurry through a porous fritted glass member, below the level of the mixing screw of the unique mixer that is used. The type of mixer used in this document is not suited for the production of boards or panels on a conventional plasterboard line, since the slurry that is produced is of high viscosity so as to adhere to the wall, making this slurry completely unsuited for the production of boards or panels. Last, this type of mixer presents the drawback of a lot of air loss. This design presents the fatal flaw of being a pump of constant volume and with no control of share of air entering the pump. This causes a variation in the water to plaster ratio.

U.S. Pat. No. 6,376,558 to Bahner discloses a conventional mixer in which air is introduced under pressure through a porous fritted glass situated in the walls of the rotating mixer. In this unique mixer, the slurry is generated in a one-step process, since all components of the slurry are introduced at the same time in the mixing chamber. This device can entrain uncontrolled air carried into the mixer by the plaster.

U.S. Pat. No. 2,097,088 to Mills discloses a conventional mixer for plasterboard in which air is introduced under pressure through apertures located in the bottom part of the mixer. Said mixer is said to be suited for mixing plaster and fibers. This document did not recognize the issue of the foaming agent and the foam stability, since foaming agents were not used at that time. Also, in this unique mixer, the slurry is generated in a one-step process, since all components of the slurry are introduced at the same time in the mixing chamber. Similarly, this device can entrain uncontrolled air carried into the mixer by the plaster.

U.S. Pat. No. 5,250,578 to Cornwell discloses a foamed cellular cementitious composition useful for sound-absorbing. The components, inter alia gypsum, water, foaming agent and film-forming agent, an aggregate, optionally fibers, and air can be combined in a slurry preferably by the classical foam introduction into the slurry. The air can also be introduced by mechanical agitation.

U.S. Pat. No. 1,687,067 to Hinton discloses a continuous process for making cellular cementitious material, in which a high-viscosity pulp (containing a so-called frothing flotation reagent or flotation oil) is agitated in a reactor, where air is bubbled from the bottom of the reactor and the foamed cementitious pulp is added well above the disk overflows from said reactor at a nearly equivalent level. The bubbles thus-formed are said to be "fine bubbles", due to the use of a rapidly rotating perforated disc or other means placed immediately above the air distributing plate. The air, in this method, that is entrapped would be poorly mixed into the slurry, especially for quick-setting cement. The mixer as described is not suitable for rapid setting cements because it permits long residence times due to the proportion of length to diameter and the vertical orientation. There is no mention of the products that could be manufactured using said process.

U.S. Pat. No. 1,660,402 to Thompson discloses a process for producing cellular cementitious material. In a first step a slurry (e.g. gypsum and water) is first produced, in a vortex mixer which does not allow the addition of foaming agent into the gauging water. This slurry is then introduced into an air-mixing chamber, where air bubbles are created. The air is agitated into the slurry without control over the quantity or form of the voids in the slurry. Colloidized water (e.g. with saponin which is the sole agent referred to in the text that could function as a foaming agent) is then introduced, where this liquid will act as a foaming agent. Hence, this process relies on the addition of the foamer after the air bubbles have been created in the slurry, where the foamer introduced further adds water to the initial amount of water, and without control of the form of the bubbles in the hardened mass. The diluted foaming agent is introduced into the second mixer, where this additional water has the same effect as the water added in the prefabricated foam of later designs.

U.S. Pat. No. 5,013,157 to Mills discloses process and an apparatus for manufacturing foamed cementitious slurry. Dry components (cement and foamer) are mixed in a screw mixer; the blend is discharged into a hopper, where said hopper is also connected to a water feeding device at its bottom part while being free at its upper part. The wet slurry then enters a further screw pump, the rotation of which creating air suction and consequently air entrainment into the wet slurry (since the rated capacity of the pump is greater than the rate at which the wet slurry are fed to the mixing inlet). Aerated slurry is thus formed.

U.S. Pat. No. 5,660,465 to Mason discloses a process and apparatus similar to the one disclosed in U.S. Pat. No. 5,013,157 above. In Mason, the water is fed at the same time to the first screw pump, so that a slurry exits said first pump. The slurry is then similarly fed from a chute into a hopper, where said hopper is connected to a positive displacement progressive cavity slurry pump. By adjusting the rotation speed, the ratio of slurry to entrained air can be modified.

In the above documents to Mills and Mason, whenever a pump is used for entraining air, this does not result in favorable results since those pumps mentioned are not mixers and do not blend correctly. At best the pumps can be qualified as kneading machines, which cannot create foams.

None of the above documents discloses a process with specific air injection matured into a reliable, industrial process used for the manufacture of acoustical panels.

There is thus still a need to provide a further process that would afford producing high quality cellular acoustical panel.

None of the above documents teaches or discloses the instant invention.

SUMMARY

The invention thus provides a continuous process for manufacturing a sound absorbing tile made from a slurry comprising, on a wet basis about 53 to about 68 wt % quick setting cement, about 17% to about 48 wt % water, about 0.05 to about 5 wt % fibers and about 0.01 to about 10 wt % foaming agent, said tile having pores comprising interconnected voids and having a porosity from 75 to 95% by volume of said tile, said process comprising the steps of: (i) mixing cementitious material, water, foaming agent but without incorporation of prefabricated foam with fibers in an amount of from 0.05 to 5% by weight based on the final weight of the tile into a slurry; subsequently; (ii) injecting and distributing air into the slurry of step (i) to form a cellular slurry; subsequently; (iii) forming tiles or precursor products of tiles from said cellular slurry; and finally (iv) allowing said cellular slurry to set into the desired tile or a precursor thereof; and optionally finishing the tile or precursor thereof according to the intended use.

A preferred embodiment is based on the use of two mixing steps that are carried out separately: the first one mixes the cementitious material, water, foamer and fibers. The second mixing or blending step is carried out to incorporate air. These mixing steps are preferably carried out at different conditions, the first being under high-shear in order to create a homogeneous slurry while the second is under controlled shear and flow path in order to create a desired foam structure. Controlled shear conditions are those conditions which the skilled man may select depending on the slurry, the rate of injection of air, and the final desired cellular or void structure. For example, depending on the slump of the slurry, the controlled-shear conditions will be either towards low-shear or towards higher-shear (but still substantially lower than the high-shear conditions of the first mixer) if one is seeking rather large or rather fine bubbles. The type of second mixer of blender will also have influence, as well as the type of foamer, additives, etc. The skilled man will know by routine tests how to determine and apply the controlled-shear conditions in order to obtain the desired void structure.

The basic idea of the preferred embodiment is to use the slurry as the liquid used to create a foamed slurry. The foaming then happens without the addition of water which necessarily comes with prefabricated foam since only air is added in a second step.

BRIEF DESCRIPTION OF THE DRAWING

The invention is disclosed with reference to the following drawing.

DETAILED DESCRIPTION OF EMBODIMENTS OF THE INVENTION

Figure 1:
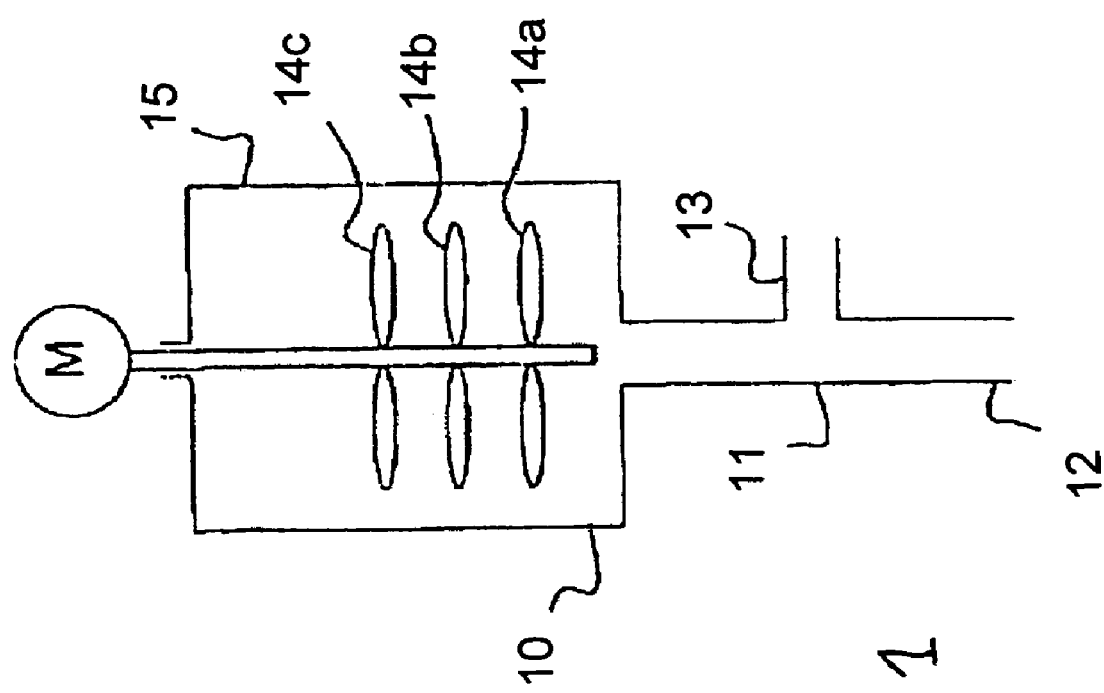
FIG. 1 is a schematic representation of a controlled shear mixer of the invention.

The invention is disclosed in more details below, where the embodiments are not given in a way to limit the practice of this invention.

The composition of the acoustical panel of the invention is the one disclosed in U.S. Pat. No. 6,443,258, which is incorporated herein by reference.

The high-shear mixer used in the invention is typically one in which the peripheral speed is generally at least 400 m/min, preferably from 500 to 700 m/min and an average residence time of 1 to 10 seconds in order to create homogeneous and lump-free slurry.

The secondary blender is generally characterized by the capability to distribute the air appropriately through the slurry (this blender or mixer cannot generally be characterized by shear or speed alone). The operative conditions depend upon the basic design of the mixer, the means of introducing air, the viscosity of the slurry, the average residence time and the desired air bubble size distribution.

The skilled man would know how to adapt dimensions and rotation speeds by routine tests, so that the final operative conditions will ensure a good blending of bubbles into the slurry. If the air is already introduced in finely divided bubbles a gentle blending to homogenize the blend is generally sufficient. In the case where the air is introduced in larger bubbles or as a continuous stream the mixer should be able to grind down the bubble size, if it is so required.

The cementitious material can be any material that will set quickly with water. Preferably the cementitious material is plaster, i.e. hydratable calcium sulfate (anhydrite or alpha or beta hemi-hydrate). It may also be any known hydraulic binder. Cementitious material is generally a fine-grained powder with a median particle size in the range of 5 to 100 μm.

The material may also comprise fillers, as set forth in U.S. Pat. No. 6,443,258.

The foaming agent that may be used can be any one that is used in the art. Reference is made to U.S. Pat. No. 6,443,258 as well.

In the invention, the slurry and the resulting set cementitious material will comprise fibers. The amount of fibers is typically from 0.05 to 5% by weight, based on the weight of the wet primary slurry. They are typically 3 to 20 mm long and have typically a diameter of 10 to 20 μm. Glass fibers or high modulus synthetic fibers are suitable. Again, one can refer to U.S. Pat. No. 6,443,258, which is incorporated by reference herein.

The resulting set cementitious material can have a void volume that varies from 75 to 95%, as taught in U.S. Pat. No. 6,443,258

The slurry obtained according to the above is disclosed as a starting material for casting a precursor of sound absorbent tiles. A precursor is the raw body used to make the final tile product after finishing. A precursor can be a body cast in a mold of the envisioned shape which needs only surface treatment. The precursor can also be a large flat panel to be cut in squares or a large block to be cut into slices. The flat panel precursor can be formed on a conventional plaster board line. The block like precursor can be cast in large block molds. Uniformity and consistency are better if cast is carried out in a continuously working mold. The reason of that choice is that the continuous mold results in a steady state fabrication, so that every element in the block has passed the same conditions.

In one embodiment, the resulting board is an acoustical tile or panel, with a NRC (Noise Reduction Coefficient) above 0.5. NRC is determined using the test method disclosed in U.S. Pat. No. 6,443,258, ASTM C423-90a.

In another embodiment, the tile will comprise a glass mat, where the cementitious slurry may penetrate partly or fully in the glass mat.

Surface finishing can be applied, as taught in U.S. Pat. No. 6,443,258 (e.g. removing the hard skin formed during the process, treating for aesthetic aspect, shaping the edges according the intended mounting method, etc).

A typical tile has dimensions of 50×150 cm and a thickness from 1 to 3 cm.

EXAMPLE

The mixing device that is used comprises a high-shear mixer, which can be of the type disclosed in DE-A-3,138,808, incorporated herein by reference. The blender for air is shown in the figure. It comprises a barrel 10, with a tee 11 at its bottom for receiving the slurry (which may be manufactured according to any high-shear process) through pipe 12 and air through pipe 13. Air and the slurry mixes to some extent in the tee, and then the mixture penetrates into barrel 10. Barrel 10 is equipped with a rotating shaft with agitator blades 14a, 14b, etc., e.g. 8 blades par stage, where the shaft would comprise e.g. 4 stages, with the lower stage being close to the inlet into barrel 10. Barrel 10 will show an inclined top discharge 15. For example, the barrel might be of about 90 mm inner diameter, with blades of about 40 mm radius and 1 mm thick. The barrel will be about 210 mm high up to the lowest part of the discharge inclined part 15, and the blades will be along the shaft separated by about 60 mm each. The inlet of the tee inside the barrel has a diameter of about 15 mm.

The following composition is prepared:

| Component | Weight (php, for 100 parts of plaster) |
| --- | --- |
| Plaster | 100 |
| Nylon fibers | 0.4 |
| Foaming agent | 0.2 |
| Water | 79.53 |

The method used for manufacturing said composition is as follows. Weigh dry fibers into the plaster and blend gently by hand. Weigh the foaming agent into the gauging water to make total liquid equal to water to plaster ratio, stir gently for a minute. Set the voltage regulator on the pump to deliver 1.8 kg of slurry per minute. Open and set the air flow to the nozzle to deliver 0.6 m3 per hour. Start and set the speed of the agitator at 45 meters per min at major diameter. Pour the fibers and the plaster into the water in 30 seconds. Mix the water and plaster into a smooth slurry with a hand kitchen mixer at maximum speed in 30 seconds. Pour the slurry into the funnel, connected to feed the pump, and start the pump. Pump the slurry into the air blender. Take the cup samples first, then the disk, and trowel the samples level. Take the rest of the aerated slurry and cast the 0.1 square meter sample board. After final set de-mold board and dry at 50° C. for 24 hours. Cut samples to fit in Kundt tube to measure noise reduction coefficient.

NRC values calculated from Kundt tube measurement are 0.70 with a plenum and 0.60 without plenum. Dry density is 0.297.

What is claimed is:

1. A continuous process for manufacturing a sound absorbing tile having an NRC above 0.5 and made from a slurry comprising, on a wet basis about 53 to about 68 wt % quick setting cement, about 17% to about 48 wt % water, about 0.05 to about 5 wt % fibers and about 0.01 to about 10 wt % foaming agent, said tile having pores comprising interconnected voids and having a porosity from 75 to 95% by volume of said tile, said process comprising the steps of:
    (i) mixing the cement, the water, the foaming agent but without incorporation of a prefabricated foam with the fibers in an amount of from 0.05 to 5% by weight based on the final weight of the tile into a slurry, under first mixing conditions; subsequently
    (ii) injecting and distributing air into the slurry of step (i) to form a cellular slurry under second mixing conditions, using a blender comprising a barrel equipped with a rotating shaft, wherein the shear is lower under the second mixing conditions than under the first mixing conditions;

(iii) subsequently depositing said slurry on at least one moving facer comprised of a glass mat to form said tiles or precursor thereof from said cellular slurry; and
(iv) finally allowing said cellular slurry to set into the tile or a precursor thereof; and
(v) optionally finishing the tile or precursor thereof.

2. The process of claim 1, in which step (i) is performed under high-shear mixing conditions.

3. The process of claim 1, in which step (ii) is performed under controlled-shear mixing conditions.

4. The process of claim 1, in which step (ii) is performed under low-shear mixing conditions.

5. The process of claim 1, in which step (i) is performed under high-shear mixing conditions and step (ii) is performed under controlled-shear mixing conditions.

6. The process of claim 1, in which step (i) is performed under high-shear mixing conditions and step (ii) is performed under low-shear mixing conditions.

7. The process of claim 1, in which the water to cement ratio is comprised from 0.25 to 1.1.

8. The process of claim 1, in which the water to cement ratio is comprised from 0.45 to 0.85.

9. The process of claim 1, in which the cement is calcium sulfate a-hemi-hydrate, calcium sulfate β-Hemi-hydrate or a blend thereof.

10. The process of claim 1, in which the precursor of tiles is a flat panel to be cut to size.

11. The process of claim 10, wherein the process is carried out on a plasterboard line.

12. The process of claim 1, in which the precursor of tiles is a block to be cut in slices.

13. The process of claim 12, in which the process is a continuous block casting method.

14. A continuous process for manufacturing a sound absorbing tile having an NRC above 0.5 and made from a slurry comprising, on a wet basis about 53 to about 68 wt % quick setting cement, about 17% to about 48 wt % water, about 0.05 to about 5 wt % fibers and about 0.01 to about 10 wt % foaming agent, said tile having pores comprising interconnected voids and having a porosity from 75 to 95% by volume of said tile, said process comprising the steps of:
(i) mixing, under high-shear first mixing conditions, the cement, the water, the foaming agent but without incorporation of a prefabricated foam with the fibers in an amount of from 0.05 to 5% by weight based on the final weight of the tile into a slurry;
(ii) subsequently injecting and distributing air into the slurry of step (i) to form a cellular slurry, using a blender comprising a barrel equipped with a rotating shaft and operated under controlled-shear or low-shear second mixing conditions, wherein the shear is lower under the second mixing conditions than under the first mixing conditions;
(iii) subsequently depositing said slurry on at least one moving facer comprised of a glass mat to form said tiles or precursor thereof from said cellular slurry; and
(iv) finally allowing said cellular slurry to set into the tile or a precursor thereof; and
(v) optionally finishing the tile or precursor thereof.

15. The process of claim 14, where the process is carried out on a plasterboard line.

16. A continuous process carried out on a plasterboard line for manufacturing a sound absorbing tile, having a NRC above 0.5, made from a slurry comprising, on a wet basis about 53 to about 68 wt % quick setting cement, about 17% to about 48 wt % water, about 0.05 to about 5 wt % fibers and about 0.01 to about 10 wt % foaming agent, said tile having pores comprising interconnected voids and having a porosity from 75 to 95% by volume of said tile, said process comprising the steps of:
(i) mixing the cement, the water, the foaming agent but without incorporation of a prefabricated foam with the fibers in an amount of from 0.05 to 5% by weight based on the final weight of the tile into a slurry under first mixing conditions;
(ii) subsequently injecting and distributing air into the slurry of step (i) to form a cellular slurry under second mixing conditions, using a blender comprising a barrel equipped with a rotating shaft, wherein the shear is lower under the second mixing conditions than under the first mixing conditions;
(iii) subsequently depositing said slurry on at least one moving facer comprised of a glass mat to form the tile or precursor products of tiles; and
(iv) finally allowing said cellular slurry to set into the tile or a precursor thereof; and
(v) optionally finishing the tile or precursor thereof according to the intended use.

17. The process of claim 1, in which step (i) is performed under high-shear mixing conditions.

18. The process of claim 1, in which step (ii) is performed under controlled-shear mixing conditions.

19. The process of claim 1, in which step (ii) is performed under low-shear mixing conditions.

20. The process of claim 1, in which step (i) is performed under high-shear mixing conditions and step (ii) is performed under controlled-shear mixing conditions.

21. The process of claim 1, in which step (i) is performed under high-shear mixing conditions and step (ii) is performed under low-shear mixing conditions.

* * * * *